United States Patent
Hirose et al.

(10) Patent No.: US 11,246,038 B2
(45) Date of Patent: Feb. 8, 2022

(54) IMAGE CAPTURING APPARATUS, CONTROL METHOD, AND STORAGE MEDIUM

(71) Applicant: CANON KABUSHIKI KAISHA, Tokyo (JP)

(72) Inventors: Eiko Hirose, Tokyo (JP); Kenta Watanabe, Kawasaki (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 16/998,430

(22) Filed: Aug. 20, 2020

(65) Prior Publication Data
US 2021/0058768 A1 Feb. 25, 2021

(30) Foreign Application Priority Data
Aug. 23, 2019 (JP) .............................. JP2019-153189

(51) Int. Cl.
*H04W 12/50* (2021.01)
*H04N 5/232* (2006.01)
*H04W 76/14* (2018.01)
*H04N 1/00* (2006.01)
*H04W 12/037* (2021.01)

(52) U.S. Cl.
CPC ........ *H04W 12/50* (2021.01); *H04N 1/00307* (2013.01); *H04N 5/23245* (2013.01); *H04W 12/037* (2021.01); *H04W 76/14* (2018.02); *H04N 2201/0084* (2013.01)

(58) Field of Classification Search
CPC .................................................... H04W 12/50
USPC ...................................................... 348/207.1
See application file for complete search history.

(56) References Cited

U.S. PATENT DOCUMENTS

2019/0097805 A1* 3/2019 Shin ...................... H04L 9/3271

FOREIGN PATENT DOCUMENTS

JP 2017-097410 A 6/2017

* cited by examiner

*Primary Examiner* — Joel W Fosselman
(74) *Attorney, Agent, or Firm* — Cowan, Liebowitz & Latman, P.C.

(57) ABSTRACT

An image capturing apparatus is provided. Upon receiving a request for encrypted communication from an external apparatus that received an advertising signal in a state where the image capturing apparatus is not paired with the external apparatus and accepting a predetermined operation made on a release switch, the request is allowed. Upon receiving a request for encrypted communication from the external apparatus that received the advertising signal in a state where the image capturing apparatus is paired with the external apparatus, the request is allowed without accepting the predetermined operation made on the release switch. In response to an operation different from the predetermined operation being received in a state where the dial is in a state corresponding to the communication mode and the image capturing apparatus is paired with the external apparatus, the pairing is canceled.

13 Claims, 12 Drawing Sheets

F I G. 4A
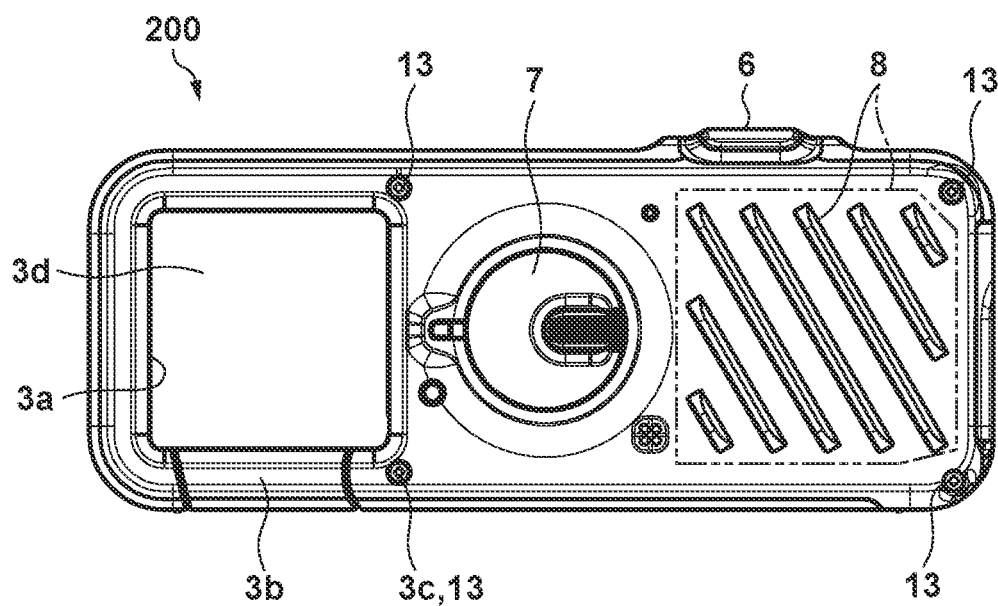
F I G. 4B
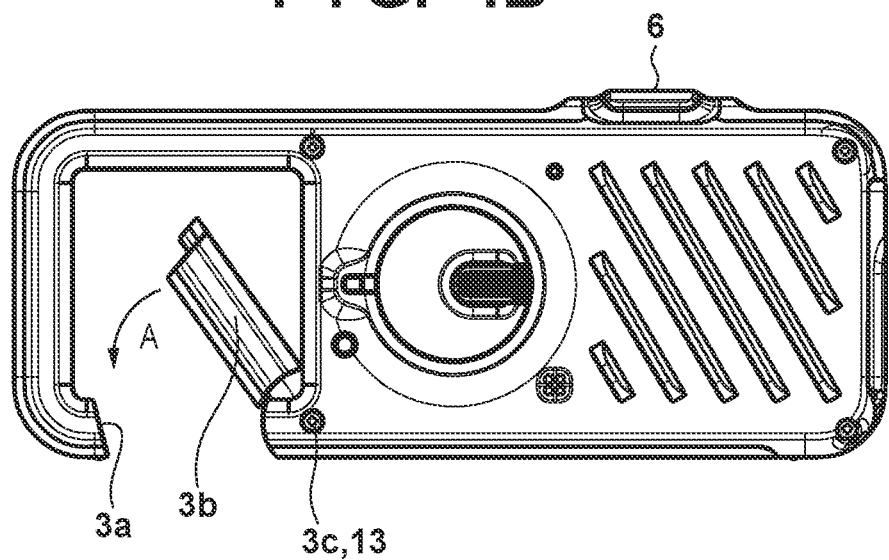

IMAGE CAPTURING APPARATUS, CONTROL METHOD, AND STORAGE MEDIUM

BACKGROUND OF THE INVENTION

Field of the Invention

The present invention relates to an image capturing apparatus, a control method, and a storage medium.

Description of the Related Art

Digital cameras provided with short-range wireless communication functions such as Bluetooth (registered trademark) have appeared in recent years. Such a digital camera uses Bluetooth to connect to a smartphone, for example. Bluetooth communication makes it possible to communicate while consuming little power. Furthermore, pairing the digital camera with a smartphone enables encrypted communication.

When pairing two devices, measures are taken to prevent mistakenly pairing with the wrong device, by having a user confirm the devices which are to be paired. Japanese Patent Laid-Open No. 2017-097410 discloses a technique in which when a user selects a device to be paired using their smartphone, the smartphone generates a confirmation code and sends the confirmation code to the device selected by the user, and the target device then displays the confirmation code. The user then views the confirmation code, which prevents them from mistakenly pairing with the wrong device.

However, some digital cameras do not include display units such as liquid-crystal screens in order to make the camera smaller and improve its durability. If a digital camera lacks a display unit, a confirmation code cannot be displayed in the digital camera as per the stated past technique. The user therefore cannot confirm that pairing, and may, as a result, end up pairing with an unintended device.

SUMMARY OF THE INVENTION

The present invention provides, for example, an image capturing apparatus useful in terms of improving security during pairing.

The present invention in its one aspect provides an image capturing apparatus comprising an image capturing unit, a release switch for accepting, from a user, an instruction to capture an image using the image capturing unit, a dial, a control unit that controls the apparatus to operate in one of a plurality of modes in accordance with a state of the dial, the modes including a communication mode and a shooting mode, and a communication unit that communicates with an external apparatus, wherein the control unit controls the communication unit to issue an advertising signal in response to the dial entering a state corresponding to the communication mode, in response to receiving a request for encrypted communication from the external apparatus that received the advertising signal in a state where the image capturing apparatus is not paired with the external apparatus and accepting a predetermined operation made on the release switch, allows the request for the encrypted communication, in response to receiving a request for encrypted communication from the external apparatus that received the advertising signal in a state where the image capturing apparatus is paired with the external apparatus, allows the request for the encrypted communication without accepting the predetermined operation made on the release switch, and in response to an operation different from the predetermined operation on the release switch being received in a state where the dial is in a state corresponding to the communication mode and the image capturing apparatus is paired with the external apparatus, cancels the pairing.

Further features of the present invention will become apparent from the following description of exemplary embodiments (with reference to the attached drawings).

BRIEF DESCRIPTION OF THE DRAWINGS

FIGS. 4A and 4B are diagrams illustrating the configuration of a carabiner part of the digital camera.

DESCRIPTION OF THE EMBODIMENTS

Figure 1:
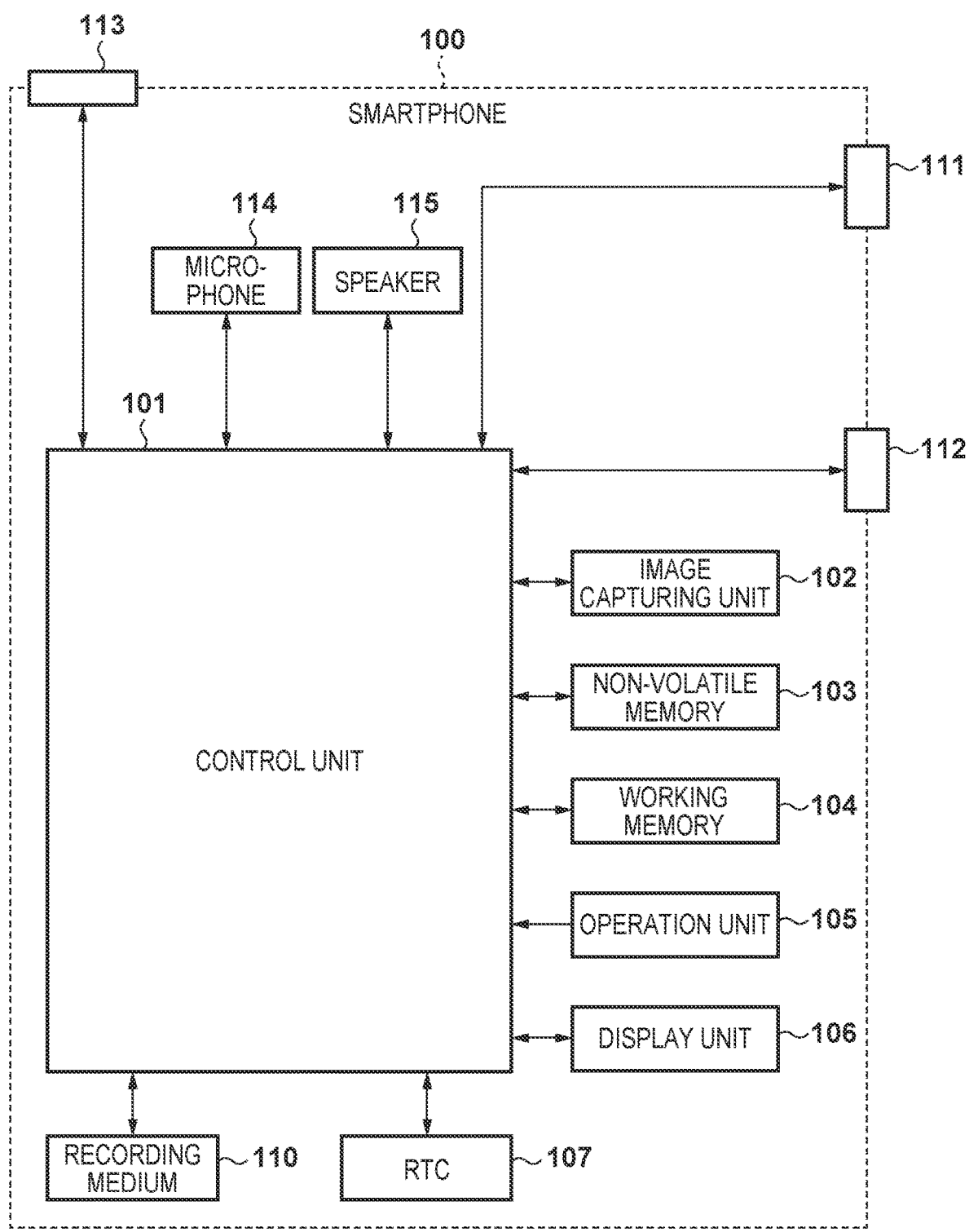
FIG. 1 is a diagram illustrating the configuration of a smartphone.

Hereinafter, embodiments will be described in detail with reference to the attached drawings. Note, the following embodiments are not intended to limit the scope of the claimed invention. Multiple features are described in the embodiments, but limitation is not made an invention that requires all such features, and multiple such features may be combined as appropriate. Furthermore, in the attached drawings, the same reference numerals are given to the same or similar configurations, and redundant description thereof is omitted.

First Embodiment

Internal Configuration of Smartphone 100

FIG. 1 is a hardware configuration diagram illustrating an example of the configuration of a smartphone 100 serving as an example of an information processing apparatus according to the present embodiment. Although a smartphone is described here as an example of the information processing apparatus, the information processing apparatus is not limited thereto. The information processing apparatus may be a digital camera having wireless functionality, a tablet device, a personal computer, or the like, for example.

A control unit 101 controls the various units of the smartphone 100 by executing programs, which will be described later. Note that a plurality of pieces of hardware may control the overall device by sharing processing rather than the control unit 101 controlling the overall device.

An image capturing unit 102 includes an optical system and an image sensor, and shoots still images, moving images, and so on. The smartphone 100 also includes a microphone 114 and a speaker 115.

Non-volatile memory 103 is non-volatile memory that can be electrically erased and recorded to. One or more programs executed by the control unit 101, data, and so on are stored in the non-volatile memory 103. The one or more programs include an operating system (OS), which is basic software, as well as applications which implement practical functions by operating cooperatively with the OS. The one or more programs further include an application for communicating with a digital camera 200, which will be described later. Work memory 104 is used as image display memory for a display unit 106, a work region for the control unit 101, and so on.

An operation unit 105 is used for accepting instructions made in the smartphone 100 by a user. The operation unit 105 includes, for example, a power button through which the user instructs the power of the smartphone 100 to be turned on and off, an operation member that sets an RTC 107, an operation member such as a touch panel formed on the display unit 106, and so on.

The display unit 106 displays image data, text for interactive operations, and so on. Note that the smartphone 100 does not absolutely need to include the display unit 106. If the display unit 106 is an external apparatus with respect to the smartphone 100, it is sufficient for the smartphone 100 to be connectable to the display unit 106 and have a display control function for controlling the display in the display unit 106.

The RTC 107 manages a clock. With the RTC 107, the clock can be set on the basis of time information designated by the user through the operation unit 105. The clock settings may be made on the basis of time information obtained through a communication unit 111, a communication unit 112, or a public network connection unit 113; or may be made on the basis of time information captured by a radio clock. Alternatively, the clock settings may be made on the basis of time information detected from a mechanical mechanism such as an analog clock.

Image data transferred through the communication unit 111 can be recorded into a recording medium 110. The recording medium 110 may be configured to be removable from the smartphone 100, or may be built into the smartphone 100.

The communication unit 111 is an interface for connecting to an external apparatus. The smartphone 100 can exchange data with the external apparatus through the communication unit 111. In the embodiment, the communication unit 111 includes an antenna, and the control unit 101 can connect to the digital camera 200 via the antenna. Additionally, in the embodiment, the communication unit 111 includes an interface for communicating with the external apparatus over a wireless LAN compliant with, for example, the IEEE 802.11 standard. The control unit 101 implements wireless communication with the external apparatus by controlling the communication unit 111. Note that the communication method is not limited to wireless LAN, and can include an infrared communication method as well, for example.

The communication unit 112 is an interface for performing short-range wireless communication, for example, with the external apparatus. The smartphone 100 can exchange data with the external apparatus through the communication unit 112. The smartphone 100 can receive image data generated by the digital camera 200 through the communication unit 112, for example. In the embodiment, the communication unit 112 includes an interface for communicating with the external apparatus over Bluetooth (registered trademark) compliant with, for example, the IEEE 802.15.1 standard. The control unit 101 implements wireless communication with the external apparatus by controlling the communication unit 112. Note that the communication method is not limited to Bluetooth, and can include wireless LAN compliant with the IEEE 802.11 standard or an infrared communication method as well, for example.

The communication unit 112 supports Bluetooth's peripheral mode and central mode, and can selectively use either peripheral mode or central mode. Operating the communication unit 112 in central mode makes it possible for the smartphone 100 to function as a Bluetooth server device. When the smartphone 100 functions as a server device, the smartphone 100 can communicate with an external apparatus operating in peripheral mode by connecting to that external apparatus. Note that for authenticating the external apparatus to which a connection is made, unique information of the external apparatus being connected to is stored in the non-volatile memory 103 by performing pairing in advance.

Configuration of Digital Camera 200

Figure 2:
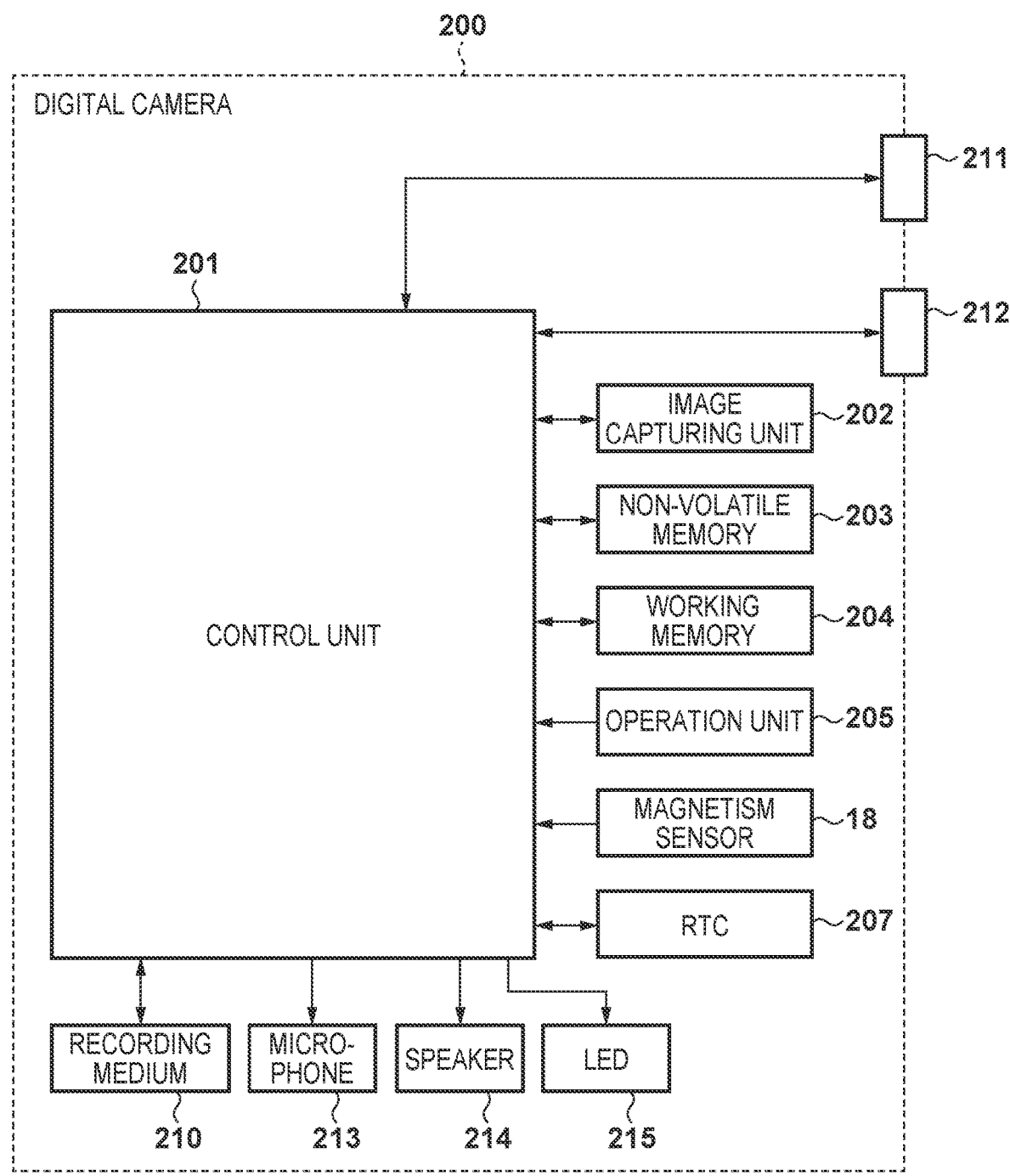
FIG. 2 is a diagram illustrating the configuration of a digital camera.

FIG. 2 is a hardware configuration diagram illustrating an example of the configuration of the digital camera 200 serving as an example of an image capturing apparatus according to the present embodiment. Although a digital camera is described here as an example of the image capturing apparatus, the image capturing apparatus is not limited thereto. For example, the image capturing apparatus can be a portable media player, a tablet device, a personal computer, or the like having image capturing functionality.

A control unit 201 controls the various units of the digital camera 200 by executing programs, which will be described later. As such, in the present embodiment, the control unit 201 can function as a control unit that controls the digital camera 200 to operate in one of a plurality of modes, including a communication mode and a shooting mode, in accordance with the state of a mode change dial 7. The control unit 201 can also function as a processing unit that executes pairing processing (described later) and a sensing unit that senses a predetermined operation made through an operation member. Note that a plurality of pieces of hardware may control the overall apparatus by sharing processes rather than the control unit 201 controlling the overall apparatus.

An image capturing unit 202 can include, for example, an optical lens unit, an optical system that controls aperture, zoom, and focus, an image sensor for converting light entering through the optical lens unit into an electrical image signal, and so on. A Complementary Metal Oxide Semiconductor (CMOS), a Charge Coupled Device (CCD), or the like is typically used as the image sensor. Under the control of the control unit 201, the image capturing unit 202 uses the image sensor to convert subject light, formed as an image by a lens included in the image capturing unit 202, into an electrical signal, performs noise reduction processing and the like, and outputs digital data as image data. In the embodiment, the image data is recorded in a recording medium 210 compliant with the DCF (Design Rule for Camera File System) standard, for example.

Non-volatile memory 203 is non-volatile memory that can be electrically erased and recorded to. Programs executed by the control unit 201 (described later) and so on are stored in the non-volatile memory 203. Working memory 204 is used as buffer memory that temporarily stores the image data captured by the image capturing unit 202, a work region for the control unit 201, and so on.

An operation unit 205 is used for accepting instructions made to the digital camera 200 by a user. The operation unit 205 includes, for example, a power switch through which the user instructs the power of the digital camera 200 to turn on and off, a mode change dial for switching shooting modes, a release button (release switch) for instructing a shot to be taken, and so on.

An RTC 207 manages a clock. In the RTC 207, clock settings can be made on the basis of time information obtained through a communication unit 211, or can be made on the basis of time information captured by a radio clock.

Image data output from the image capturing unit 202 can be recorded into the recording medium 210. The recording medium 210 may be configured to be removable from the digital camera 200, or may be built into the digital camera 200.

The communication unit 211 is an interface for connecting to an external apparatus. The digital camera 200 can exchange data with the external apparatus via the communication unit 211. For example, the image data generated by the image capturing unit 202 can be transmitted to the external apparatus via the communication unit 211. In the embodiment, the communication unit 211 includes an interface for communicating with the external apparatus over a wireless LAN compliant with, for example, the IEEE 802.11 standard. The control unit 201 implements wireless communication with the external apparatus by controlling the communication unit 211. Note that the communication method is not limited to wireless LAN, and can include an infrared communication method as well, for example.

A communication unit 212 is an interface for performing short-range wireless communication, for example, with the external apparatus. The digital camera 200 can exchange data with the external apparatus via the communication unit 212. The digital camera 200 can transmit the image data generated by the image capturing unit 202, for example, to the external apparatus via the communication unit 212. In the embodiment, the communication unit 212 includes an interface for communicating with the external apparatus over Bluetooth compliant with, for example, the IEEE 802.15.1 standard. The control unit 201 implements wireless communication with the external apparatus by controlling the communication unit 212. Note that the communication method is not limited to Bluetooth, and can include wireless LAN compliant with the IEEE 802.11 standard or an infrared communication method as well, for example.

The communication unit 212 supports Bluetooth's peripheral mode and central mode, and can selectively use either peripheral mode or central mode. By operating the communication unit 212 in the peripheral mode, the digital camera 200 can operate as a client device according to Bluetooth. When the digital camera 200 operates as a client device, the digital camera 200 can communicate with an external apparatus operating in central mode by connecting to that external apparatus. Note that for authenticating the external apparatus to which a connection is made, unique information of the external apparatus being connected to is stored in the non-volatile memory 203 by performing pairing in advance.

The digital camera 200 further includes a microphone 213, a speaker 214, and an LED 215.

Figure 3A:
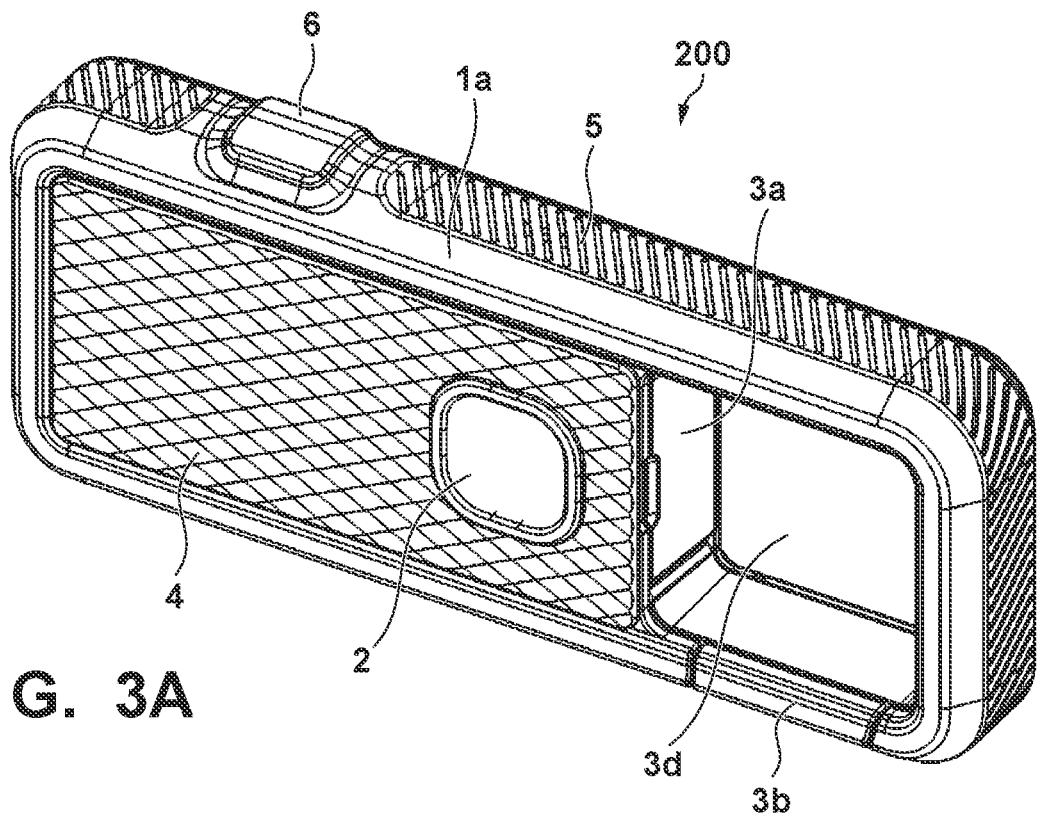
FIGS. 3A and 3B are diagrams illustrating the external configuration of the digital camera.
Figure 3B:
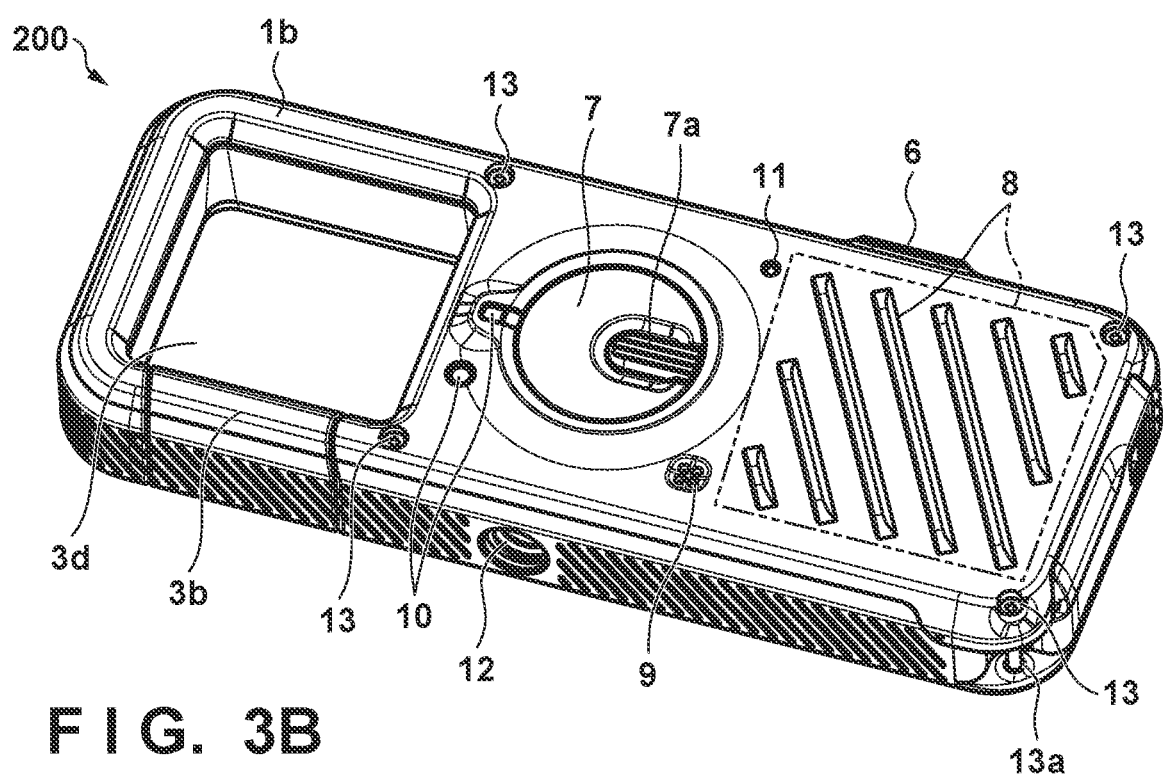

The external appearance of the digital camera 200 will be described next. FIG. 3A is an external perspective view illustrating the digital camera 200, which is an example of an image capturing apparatus according to the embodiment, from a front side (a subject side). FIG. 3B is an external perspective view illustrating the digital camera 200 from a rear side, which is opposite from the subject side. The digital camera 200 illustrated in FIGS. 3A and 3B includes a front cover 1a and a rear cover 1b, which serve as a housing, and a lens unit 2. The digital camera 200 includes a clip part formed as a carabiner, which will be called a carabiner part 3. The carabiner part 3 will be described later.

An interchangeable panel 4 is a removable decorative panel. A microphone hole 5 is an opening which passes through to the microphone 213. The microphone of the digital camera 200 is particularly used when shooting moving images. A pushbutton-type release button 6 is provided on a top surface, and the user can input a shooting instruction by making a pushing operation on the release button 6.

The mode change dial 7, a rear surface grip part 8, a speaker hole 9, an LED window 10, and a reset button 11 are provided on the rear cover 1b side. The speaker hole 9 is an opening which passes through to the speaker 214, and the LED window 10 is an opening or a transparent part which enables light emitted by the LED 215 to be seen. A tripod hole 12 is provided on a bottom surface of the camera. The mode change dial 7 is an operation member for switching to one of a plurality of modes including a communication mode and shooting mode, making operations for turning the power off, and so on. The rear surface grip part 8 is shaped to be used as a finger rest for placing the user's right-hand fingers and improving the user's grip during shooting, and has recessed and projections formed in its surface. Screws 13 are fastening members which fasten the front cover 1a and the rear cover 1b together, and the fastened front cover 1a and rear cover 1b serve as an outer housing of the digital camera 200. A strap cord securing part is formed by cutting out part of the outer housing and leaving part of a screw shaft part 13a of one of the screws 13 exposed from the outer housing.

The configuration of the carabiner part 3 will be described next. FIG. 4A is a diagram illustrating the carabiner part 3 in a closed state, and FIG. 4B is a diagram illustrating the carabiner part 3 in an open state.

The carabiner part 3 is configured as a frame body (a ring) by a main member 3a and a swinging gate member 3b, and an opening 3d is formed by this frame body. One end of the gate member 3b is axially supported by a rotation shaft 3c so as to be capable of pivoting. Accordingly, the gate member 3b can pivot (swing) about the rotation shaft 3c, and can enter the open state by being pivoted to a predetermined angle. One of the screws 13 doubles as the rotation shaft 3c, and the rotation shaft 3c therefore is also a fastening member that fastens the front cover 1a to the rear cover 1b.

The gate member 3b is a member for opening and closing the ring formed by the carabiner part 3. The gate member 3b continually receives biasing force in the direction of an arrow A, i.e., toward the closed state, from a spring member (not shown), and contacts the main member 3a, which restricts the position of the gate member 3b. The gate member 3b can be moved from the closed state to the open state by pushing the gate member 3b with a force greater than the biasing force received from the spring member.

By having such a mechanism which is capable of opening and closing, the carabiner part 3 can function as a clip for attaching the digital camera 200 to the user's clothing, accessories, and soon. Although the carabiner part 3 is described as an independent part for the sake of convenience, it should be noted that in the present embodiment, the main member 3a of the carabiner part 3 is a part of the front cover 1a and the rear cover 1b of the digital camera 200, and the carabiner part 3 forms part of the outer housing of the digital camera 200. In other words, it can be said that the digital camera 200 itself has a structure that serves as a carabiner. Of course, it is not absolutely necessary for the carabiner part 3 and the digital camera 200 to be formed integrally, and the carabiner part 3 may be connected to the housing of the digital camera by screws or the like.

Overview of Pairing

Figure 5A:
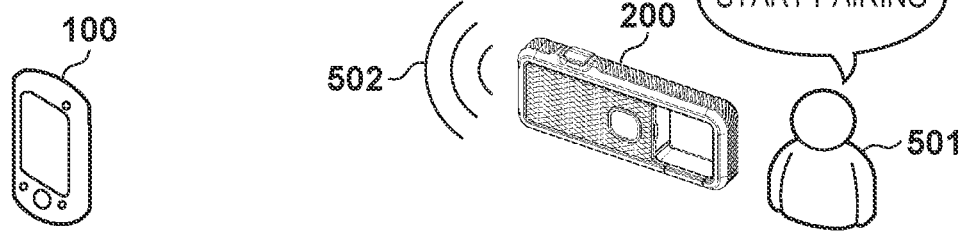
FIGS. 5A to 5C are diagrams illustrating an overview of pairing processing.
Figure 5B:
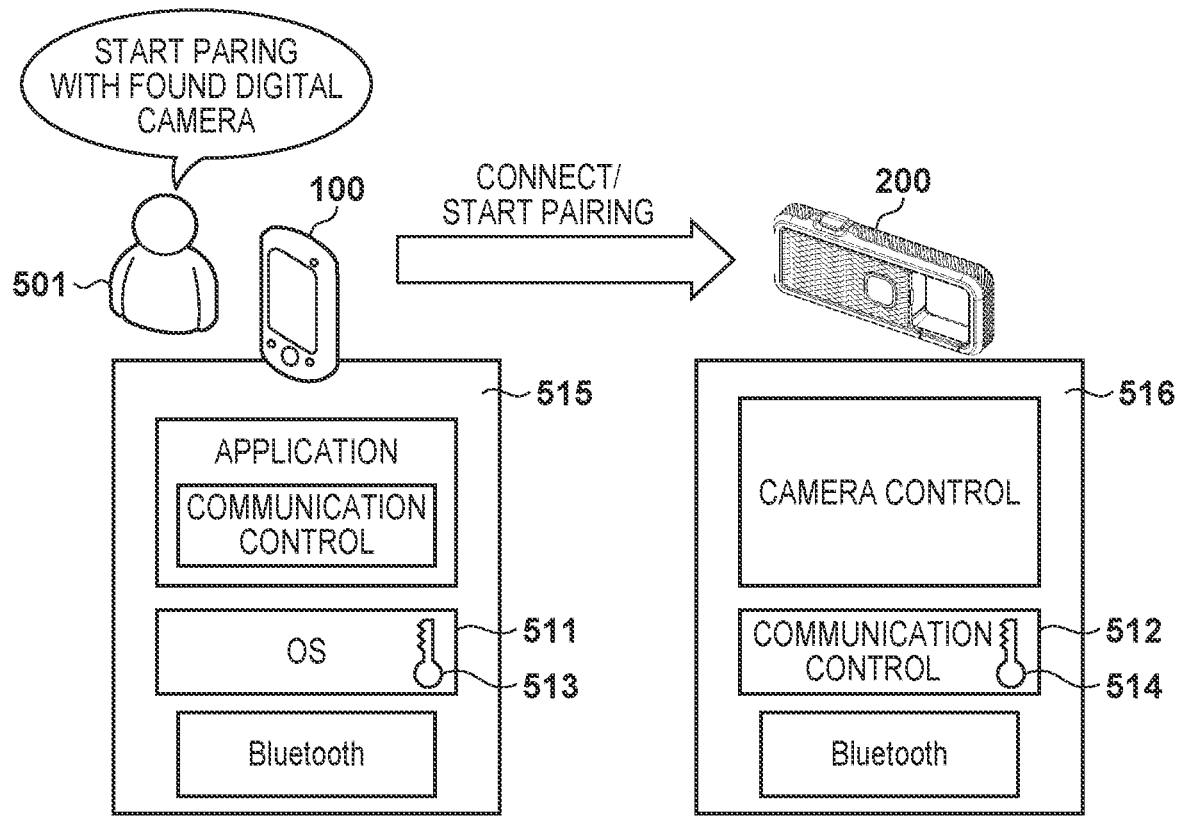
Figure 5C:
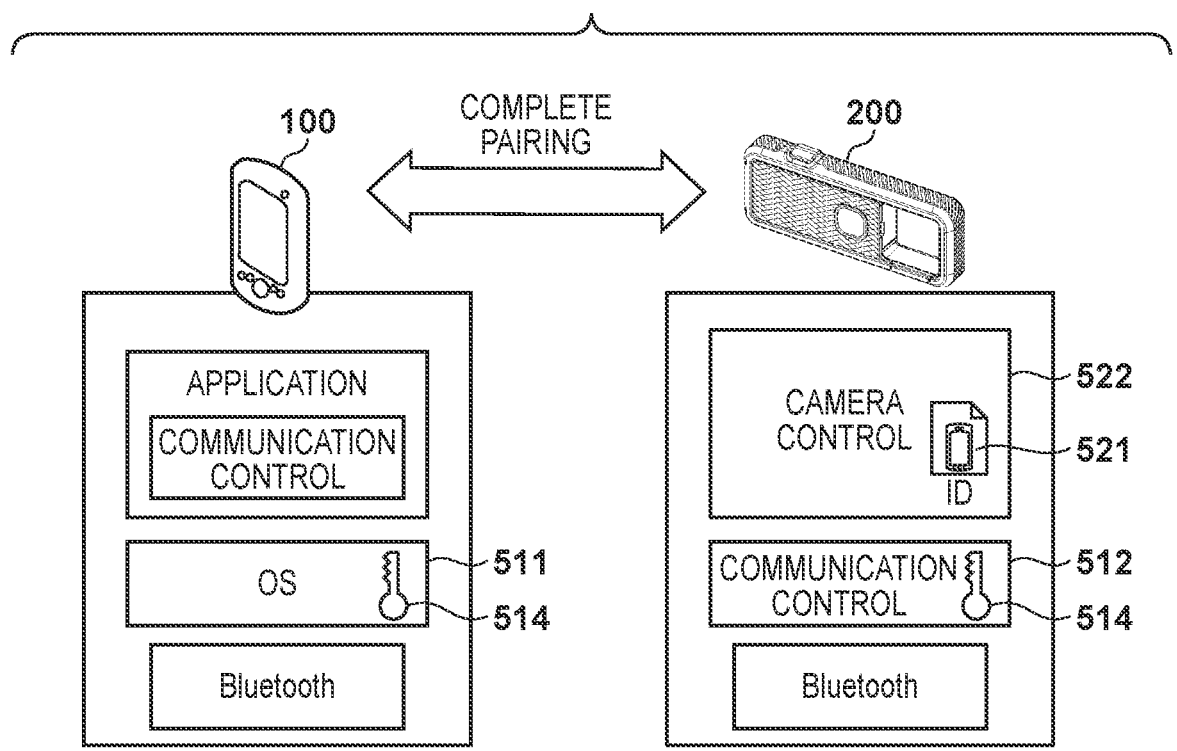

FIGS. 5A to 5C are diagrams illustrating a functional configuration used in processing leading up to Bluetooth pairing being established between the digital camera 200 and the smartphone 100. The following will describe a flow from when a user 501 instructs pairing to start using the digital camera 200, to when pairing with the smartphone 100 is complete. "Pairing" is processing in which encryption keys are exchanged between two devices in order to establish encrypted communication between the two devices using short-range wireless communication.

FIG. 5A illustrates pairing being started by the user 501 operating the digital camera 200. When the pairing is started, the digital camera 200 broadcasts an advertising signal 502.

FIG. 5B illustrates a state in which the digital camera 200 and the smartphone 100 are connected over Bluetooth and have exchanged encryption keys for encrypted communication. The smartphone 100 receives the advertising signal from the digital camera 200 through the communication unit 112 and, on the basis of a pairing request from the digital camera 200 obtained from data in the advertising signal, displays an indication that the digital camera has been detected in the display unit 106. The smartphone 100 accepts, from the user 501, an operation for starting the pairing with the digital camera 200. In response to this operation, the smartphone 100 sends a Bluetooth connection request to the digital camera 200. A Bluetooth connection is established between the digital camera 200 and the smartphone 100 as a result. The smartphone 100 issues a pairing request to the digital camera 200, and if the request is accepted, encryption keys for encrypting communication data are exchanged, which places the smartphone 100 and the digital camera 200 in a state where encrypted communication is possible. An encryption key 514 of the smartphone 100 is saved in a communication control module 512 of a software module configuration 516 operated by the control unit 201 of the digital camera 200. An encryption key 513 of the digital camera 200 is saved in an OS 511 of a software module configuration 515 operated by the control unit 101 of the smartphone 100. Once the encryption key 514 is saved in the OS 511, the OS 511 enters a state in which encrypted communication can be performed with the digital camera 200.

FIG. 5C is a diagram illustrating a state in which a smartphone ID 521 of the smartphone 100 has been passed to the digital camera 200 through encrypted communication, after the digital camera 200 and the smartphone 100 are connected over Bluetooth and are in a state in which encrypted communication can be performed. Once the smartphone ID 521 is passed to the digital camera 200, the smartphone ID 521 is stored by a camera control module 522. A state in which pairing with the smartphone 100 is already complete can be determined on the basis of the smartphone ID 521 being stored.

After this, shooting parameters, camera settings, and the like of the digital camera 200 can be changed from the smartphone 100 over Bluetooth communication. The digital camera 200 according to the present embodiment is configured without a display unit such as a liquid-crystal screen, and thus shooting parameters, camera settings, and the like cannot be changed while viewing a display unit, as with a typical camera. However, by causing the smartphone 100 and the digital camera 200 to communicate and making it possible for the digital camera 200 to be controlled by the smartphone 100, the user can use the digital camera 200 in the same manner as a camera which has a display unit. Additionally, the user can use the operation unit 105 to instruct the smartphone 100 to execute image transfers, remote shooting functions, and the like which require Wi-Fi communication. In response to receiving such an instruction, the smartphone 100 issues a Wi-Fi communication connection request to the digital camera 200 through Bluetooth communication. Having received this request, the digital camera 200 forms a network with a predetermined SSID and password. In other words, the digital camera starts operating as a Wi-Fi access point, and starts issuing a beacon including a predetermined SSID. On the other hand, after issuing the Wi-Fi communication connection request to the digital camera 200 through Bluetooth communication, the smartphone 100 sends a Wi-Fi connection request to the digital camera 200 in accordance with an application. Note that the request is issued to the network of the digital camera 200, and thus the aforementioned predetermined SSID and password may be coded into the application. Alternatively, the predetermined SSID and password may be received from the digital camera 200 through Bluetooth communication. Having received the Wi-Fi connection request, the digital camera 200 establishes a Wi-Fi connection between the digital camera 200 and the smartphone 100 by allowing that request. Note that the password mentioned here may be generated at random with each connection. In this case, the generated password is received from the digital camera 200 through Bluetooth communication and used in the Wi-Fi connection.

Through the sequence described above, the smartphone 100 and the digital camera 200 can switch from Bluetooth communication to Wi-Fi communication and execute a function instructed by the user.

Additionally, the sequence for establishing Wi-Fi communication may include a function for starting Wi-Fi by operating the digital camera 200 without using Bluetooth, in addition to the sequence described above. For example, the issuing of the Bluetooth advertising signal is stopped, and the issuance of a Wi-Fi beacon including the predetermined SSID is started, in response to the release button 6 being pressed for a predetermined amount of time (e.g., 10 seconds) while the mode change dial 7 is in a position corresponding to the communication mode. By doing so, a Wi-Fi connection can also be established with a smartphone 100 lacking a Bluetooth function. The foregoing mentioned that the Wi-Fi password may be generated randomly in the sequence which uses Bluetooth. However, if Wi-Fi is started by pressing the release button 6 in this manner, there is no chance for the digital camera 200 to pass the password to the smartphone 100. Thus unlike the sequence which uses Bluetooth, a predetermined SSID and password are used when Wi-Fi is started by pressing the release button 6.

Note that the digital camera 200 stores information indicating that Wi-Fi has been started in response to the release button 6 being pressed. If the mode change dial 7 has been set to the position of another mode and is then returned to the position of the communication mode, the digital camera 200 may start Wi-Fi rather than issuing the Bluetooth advertising signal. This makes it possible to eliminate the burden of pressing the release button 6 each time in order to connect to a smartphone 100 which lacks a Bluetooth function. By setting the mode change dial 7 to the communication mode position, Wi-Fi is started without a Bluetooth advertising signal being issued. If, in this state, the release button 6 is again pressed for a predetermined amount of time (e.g., 10 seconds), the digital camera 200 may return to a state of issuing the Bluetooth advertising signal.

In this manner, causing the smartphone 100 and the digital camera 200 to communicate provides a system configuration in which the smartphone 100 can control the digital camera 200.

If, in such a configuration, the digital camera 200 is paired with another person's smartphone against the user's intentions, the camera may end up being controlled from the other person's smartphone. Thus in the processing for pairing the smartphone 100 and the digital camera 200, actions for confirming the respective devices to be paired are extremely important.

Flow of Pairing Processing in Smartphone

Figure 6A:
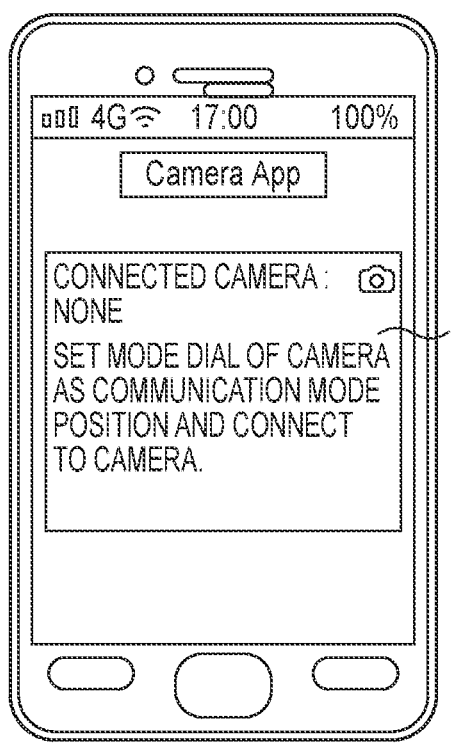
FIGS. 6A to 6G are diagrams illustrating an example of screens displayed in the smartphone.

A flow of operations performed by the smartphone 100 up to the smartphone 100 and the digital camera 200 being successfully paired through Bluetooth communication will be described next. While an application stored in the non-volatile memory 103 is running, the smartphone 100 can handle pairing processing, connection processing, and the like performed in response to the user operating the digital camera 200. FIG. 6A is an example of a display made when the smartphone 100 has launched an application. At this point in time, the smartphone 100 is not connected to the digital camera 200, and a message 601 indicating a method for operating the camera is displayed in the display unit 106.

Figure 7:
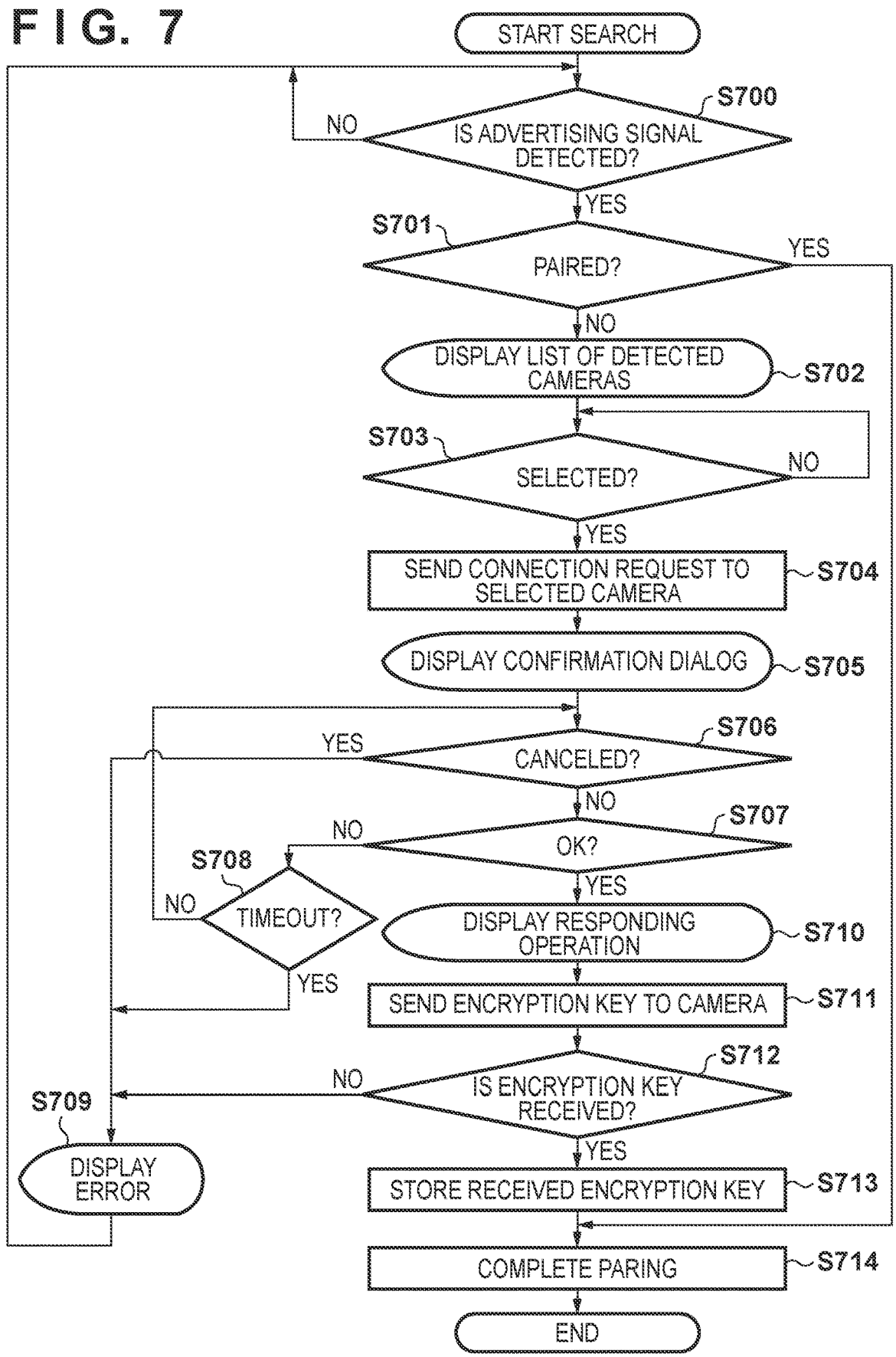
FIG. 7 is a flowchart illustrating pairing processing performed by the smartphone.

FIG. 7 is a flowchart illustrating the pairing processing performed by the smartphone 100. In step S700, the control unit 101 of the smartphone 100 stands by to receive the advertising signal. Once the control unit 101 detects the advertising signal, the sequence moves to step S701.

In step S701, the control unit 101 determines whether or not the smartphone 100 is already paired with the digital camera 200. Whether or not the devices are already paired is determined by examining the smartphone ID included in the advertising signal received in step S700. If the smartphone ID of the smartphone 100 itself has been detected from the advertising signal, the control unit 101 determines that the devices are already paired, moves the sequence to step S714, establishes Bluetooth communication with the digital camera 200, and ends the sequence. However, if the smartphone ID of the smartphone 100 itself has not been detected from the advertising signal, the control unit 101 determines that the devices are not paired, and moves the sequence to step S702.

Figure 6B:
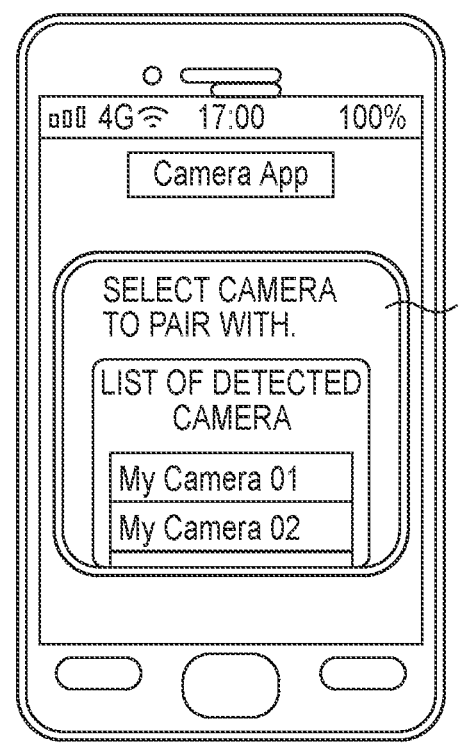

In step S702, the control unit 101 displays, in a list, the digital camera which sent the advertising signal received in step S700. If a plurality of advertising signals have been received, the control unit 101 displays the cameras that sent the signals in the list. FIG. 6B is an example of a display made by an application that displays a list of unpaired cameras in the display unit 106 of the smartphone 100. Here, camera identification information included in the advertising signal, such as a model name, device-unique ID, and so on of the digital camera, is displayed in a list display 602. The camera identification information may be configured to include a nickname given as desired by the user, color information of the camera body, and the like, so as to make it easier to identify individual cameras when a plurality of unpaired cameras are displayed.

Next, in step S703, the control unit 101 stands by until the user selects one of the digital cameras displayed in the list display 602 by operating the operation unit 105. Once the control unit 101 detects that one of the digital cameras has been selected, the sequence moves to step S704.

Assume here that the digital camera 200 has been selected in step S703. In step S704, the control unit 101 sends a Bluetooth connection request, as a response to the advertising signal, to the digital camera 200 selected in step S703, through the communication unit 112.

Figure 6C:
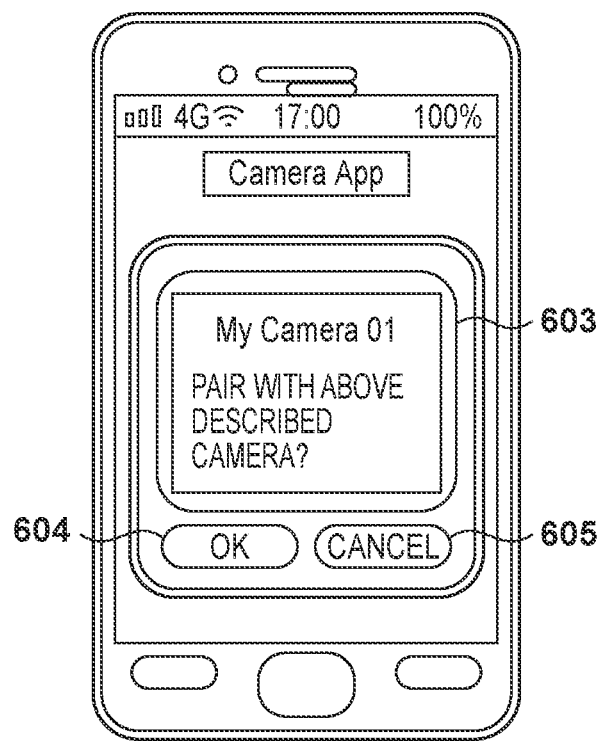

In step S705, the control unit 101 displays a confirmation dialog 603 such as that illustrated in FIG. 6C. The digital camera 200 according to the present embodiment is configured without a display unit that displays information of external apparatus attempting to pair with that camera, and thus this confirmation dialog 603 is displayed in the display unit 106 of the smartphone 100 instead. The user views the confirmation dialog 603 and confirms whether to pair the digital camera 200 selected in step S703. The confirmation dialog 603 can include an OK button 604 and a cancel button 605. In the present embodiment, a display time is set for the dialog, and thus if no user operation is made within a predetermined amount of time after the confirmation dialog 603 is displayed, the display times out and is treated as a cancellation. If in step S706 it has been detected that the cancel button 605 has been pressed, the sequence moves to step S709, whereas if it has not been detected that the cancel button 605 has been pressed, the sequence moves to step S707. If in step S707 it has been detected that the OK button 604 has been pressed, the sequence moves to step S710, whereas if it has not been detected that the OK button 604 has been pressed, the sequence moves to step S708. In step S708, the control unit 101 determines whether or not a timeout has occurred. If a timeout has not occurred, the sequence returns to step S706, and the control unit 101 stands by for a user operation. If a timeout has occurred, the sequence moves to step S709. In step S709, the control unit 101 displays an error dialog 607 such as that illustrated in FIG. 6F, and returns the sequence to the beginning (step S700).

Figure 6D:

In step S710, the control unit 101 displays an operation procedure dialog for responding to a pairing confirmation in the digital camera 200. FIG. 6D illustrates an example of the display of an operation procedure dialog 606. Like the operations for confirming the digital camera 200 to be paired in step S705, the operation procedure dialog 606 is displayed in order to perform operations for confirming the pairing in the digital camera 200. The digital camera 200 according to the present embodiment is configured without a display unit, and thus this operation procedure dialog 606 is displayed in the display unit 106 of the smartphone 100 instead. In the present embodiment, the release button 6 being pressed (an "on" operation) while the LED 215 of the digital camera 200 is flashing is used as an operation made in the digital camera 200 for responding to a pairing confirmation, and a description of that operation is displayed in the operation procedure dialog 606.

In step S711, the control unit 101 requests the digital camera 200 to perform encrypted communication by generating an encryption key for implementing the encrypted communication and sending the encryption key to the digital camera 200 through the communication unit 112. In step S712, the control unit 101 stands by to receive an encryption key from the digital camera 200. In the present embodiment, if the encryption key has not been successfully received within a predetermined amount of time, the sequence moves to step S709, whereas if the encryption key has been received within the predetermined amount of time, the sequence moves to step S713. In step S713, the control unit 101 stores the received encryption key in the non-volatile memory 103. Through this, the smartphone 100 enters a state in which encrypted communication with the digital camera 200 is possible. The sequence then moves to step S714. In step S714, the control unit 101 sends the smartphone ID to the digital camera 200.

Figure 6E:
Figure 6F:
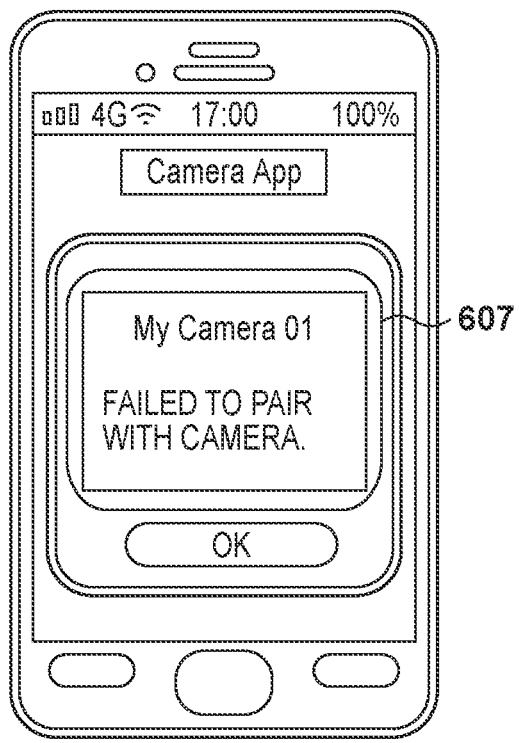

Pairing is completed through the sequence described thus far. The control unit 101 displays, in the display unit 106, information of the camera with which a connection has been made, as indicated in FIG. 6E. In this manner, a Bluetooth communication connection is established between the smartphone 100 and the digital camera 200, and the user can then operate the digital camera 200 through an application in the smartphone 100.

Flow of Digital Camera in Pairing Processing

Figure 8:
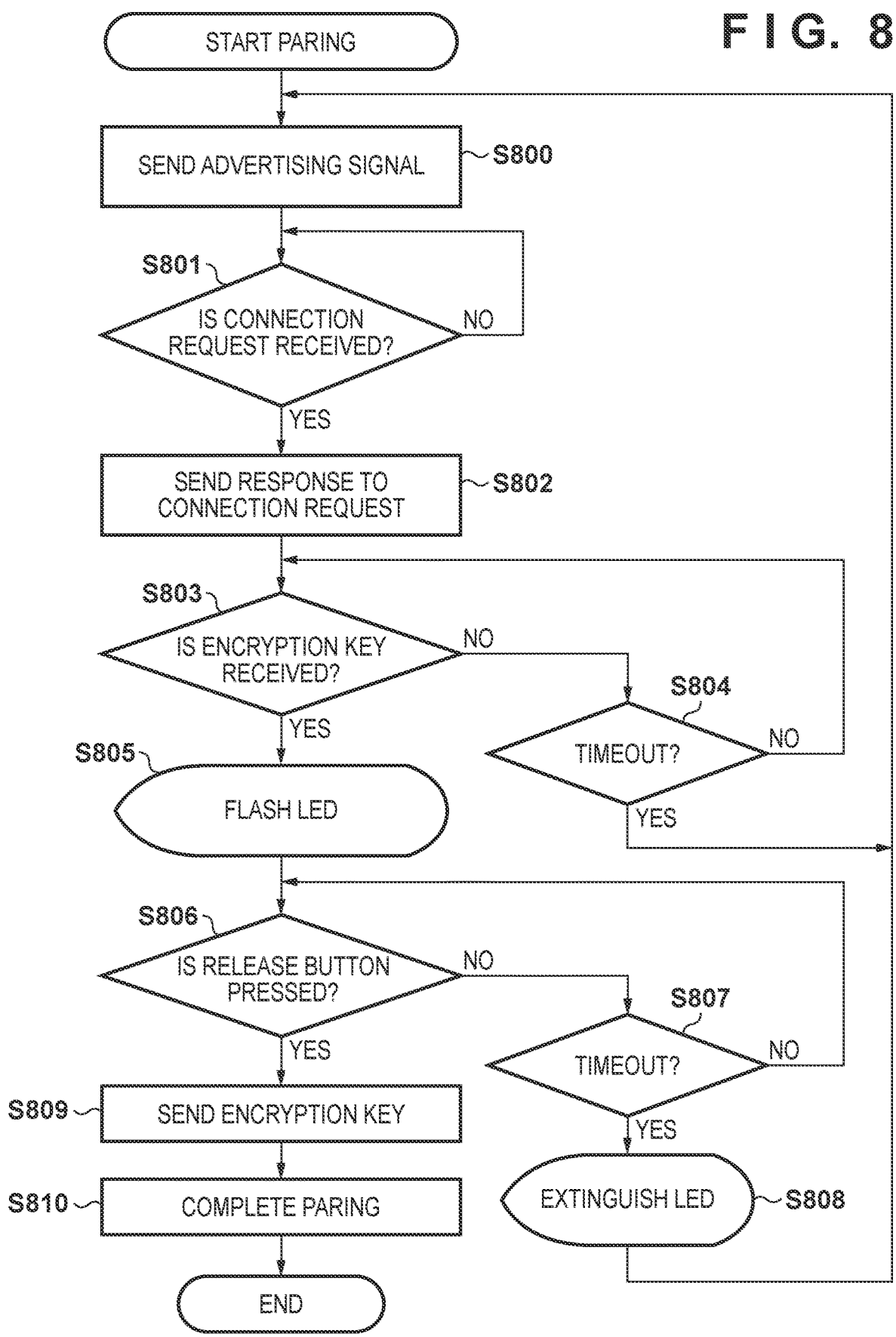
FIG. 8 is a flowchart illustrating pairing processing performed by the digital camera.

A flow of operations performed by the digital camera 200 up to the digital camera 200 and the smartphone 100 being successfully paired through Bluetooth communication will be described next. FIG. 8 is a flowchart illustrating operations performed by the digital camera 200 which has been paired with the smartphone 100.

In step S800, the control unit 201 of the digital camera 200 broadcasts the advertising signal in accordance with the user setting the mode change dial 7 to the communication mode position. This advertising signal includes the model name, device-unique ID, and so on of the digital camera 200 that sent the signal. The smartphone 100 can determine whether or not the device that issued the advertising signal is a compatible device on the basis of the signal. If the digital camera 200 is already paired with a smartphone, the control unit 201 sends the advertising signal including the smartphone ID of the smartphone with which the camera is already paired. If there is no smartphone with which the camera is already paired, the control unit 201 sends the advertising signal with an empty (NULL) smartphone ID. Through this, in step S701 of FIG. 7, the smartphone 100 can determine whether or not the digital camera 200 which issued the advertising signal is already paired. Note that if the digital camera 200 is already paired with a smartphone but the user wishes to pair the camera with a different smartphone, the user can perform the following operations. The user sets the mode change dial 7 of the digital camera 200 to the communication mode position, and then presses the release button 6 for a set amount of time (e.g., 2 seconds). As a result, the control unit 201 cancels the pairing, and then issues another advertising signal, with an empty (NULL) smartphone ID in the advertising signal issued in response to the mode change dial 7 having been set to the communication mode position. In this manner, when the release button 6 remains in an operated state for greater than or equal to a predetermined amount of time, the control unit 201 performs control for canceling the pairing with an external apparatus, and then starting to issue an advertising signal which does not include information pertaining to the external apparatus. Note that these operations may be assigned to operations such as pressing the reset button 11, quickly pressing the release button 6 two or more times, or the like instead. Note also that image capturing processing is not executed in response to the release button 6 being pressed in this case. Furthermore, it is assumed that the digital camera 200 according to the present embodiment can only be paired with a single smartphone at a time.

The foregoing describes that a function may be included for starting Wi-Fi in response to the release button 6 being pressed for a predetermined amount of time (e.g., 10 seconds) while the mode change dial 7 is set to the communication mode position. When this function is provided, it is necessary to distinguish a press made for the purpose of canceling pairing. As such, when the release button 6 is pressed while the mode change dial 7 is set to the communication mode position, and is then released by the user removing the pressing finger, the time from when the button is pressed to when the button is released is measured. The pairing may be canceled if the measured time is greater than or equal to 2 seconds and less than 10 seconds, and Wi-Fi may be started, without canceling the pairing, if the measured time is greater than or equal to 10 seconds. In other words, if a state in which the release button 6 is operated continues for greater than or equal to a predetermined amount of time, and the release button 6 is then no longer operated, the control unit 201 cancels the pairing with the external apparatus. The control unit 201 then starts issuing the advertising signal that does not include information pertaining to the external apparatus. On the other hand, if the state in which the release button 6 is operated has continued for a time longer than the predetermined amount of time, and the release button 6 is then no longer operated, the control unit 201 does not cancel the pairing with the external apparatus. At this time, the control unit 201 activates the communication unit 211, which is a second communication unit having a faster communication speed than the communication unit 212 (i.e., starts Wi-Fi), without canceling the pairing.

In step S801, the control unit 201 stands by to receive the connection request, which is a response to the advertising signal, sent from the smartphone 100. This connection request corresponds to the one sent from the smartphone 100 in step S704 of FIG. 7. Once the connection request has been received from the control unit 201, the sequence moves to step S802. In step S802, the control unit 201 sends a response to the connection request to the smartphone 100, and establishes a connection over Bluetooth communication, which is short-range wireless communication.

The control unit 201 then performs processing for implementing encrypted communication with the smartphone 100. In step S803, the control unit 201 determines whether an encryption key has been received from the smartphone 100. This encryption key corresponds to the one sent from the smartphone 100 in step S711 on FIG. 7 as a request for encrypted communication. If the control unit 201 determines that the encryption key has been received, i.e., if a request for encrypted communication has been received, the sequence moves to step S805, whereas if the control unit 201 determines that the encryption key has not been received, the sequence moves to step S804.

If, in the steps from S804 on, a predetermined operation made using an operation member is sensed before a predetermined amount of time has passed following the reception of the encryption key of the smartphone 100, the encryption key of the digital camera 200 is sent to the smartphone 100. This will be described in detail below.

In step S804, the control unit 201 determines whether or not a timeout has occurred. If a timeout has not occurred, the sequence returns to step S803, where the control unit 201 stands by to receive the encryption key from the smartphone 100. If a timeout occurs without the control unit 201 receiving the encryption key from the smartphone 100 within a predetermined amount of time, the sequence returns to the beginning (step S800).

In step S805, the control unit 201 causes the LED 215, which is a notifying unit, to flash. The notifying unit may be configured to emit a buzzer sound instead of causing the LED 215 to flash. Additionally, the flashing of the LED 215 may include a plurality of lighting patterns, such as fast flashing, slow flashing, and changing colors, and the configuration may be such that the flashing is combined with a buzzer sound. In this manner, the control unit 201 controls the notifying unit to use at least one of light and sound to notify the user that operating the release button is enabled as a confirmation operation before the encryption key of the digital camera 200 is sent, until a predetermined amount of time has passed.

In step S806, the control unit 201 determines whether the release button 6 has been pressed by the user while the LED 215 is flashing. If it is determined that the release button 6 has been pressed, the control unit 201 determines that the user has confirmed the pairing with the smartphone that sent the encryption key received in step S803, and the sequence moves to step S809. If, in step S806, the control unit 201 determines that the release button 6 has not been pressed, the sequence moves to step S807. The pairing confirmation operation of the release button 6 having been pressed, subject to the determination of step S806, corresponds to an operation carried out in accordance with the details of the operation procedure dialog 606 (FIG. 6D) displayed in the display unit 106 by the smartphone 100 in step S710 of FIG. 7. In other words, when the user wishes to pair with a smartphone 100A, the user responds to a pairing request from the smartphone 100A by operating the digital camera 200 on the basis of operating instructions displayed in the display screen of the smartphone 100A. If the pairing request is from a smartphone 100B, which is not to be paired, the operation procedure dialog 606 is displayed in a display unit of the smartphone 100B, and thus the user of the smartphone 100A cannot see that operation procedure dialog 606. Accordingly, the user of the smartphone 100A cannot respond to the pairing request using the digital camera 200. As a result, the digital camera 200 is prevented from pairing with an unintended smartphone.

Note that the pairing confirmation operation may be an operation for switching the mode change dial 7, instead of pressing the release button 6. A plurality of methods for operating an operation member to confirm pairing may be provided, and the operation method may be designated in the smartphone 100. The operation method may be designated in the smartphone by the digital camera 200 including, in the advertising signal, information pertaining to a predetermined operation made through the release button. In this case, the smartphone 100 displays the designated operation method. A combination of a plurality of operations may be designated as well. For example, the advertising signal is sent including information indicating the release button 6 being pressed and the carabiner part being opened at the same time, and the smartphone displays those operations in an understandable state. Having confirmed this, the user responds to the pairing request by pressing the release button 6 of the digital camera 200 and opening the carabiner part at the same time.

The foregoing describes a configuration in which in step S800, the advertising signal is broadcast in accordance with the mode change dial 7 of the digital camera 200 being set to the communication mode position. However, the configuration may instead be such that the advertising signal is broadcast in response to the release button 6 being pressed after the mode change dial 7 is set to the communication mode position. In this case, the start of the pairing in step S800 and the pairing confirmation operation in step S806 are the same, which makes it possible to provide an operation method that is easy for the user to understand and is more intuitive.

In step S807, the control unit 201 determines whether or not a timeout has occurred. If a timeout has not occurred, the sequence returns to step S806, where the control unit 201 stands by for the release button 6 to be pressed by the user. If a timeout has occurred without the release button 6 being pressed by the user within a predetermined amount of time, the sequence moves to step S808, where the control unit 201 extinguishes the LED 215 and then returns the sequence to the beginning (S800).

In step S809, the control unit 201 generates the encryption key of the digital camera 200 and sends that encryption key to the smartphone 100 through the communication unit 212. The digital camera 200 and the smartphone 100 store each others' encryption keys and use those keys in subsequent encrypted communication. The control unit 201 stores the encryption key of the smartphone 100, received in step S803, in the non-volatile memory 203.

In step S810, the control unit 201 stores the smartphone ID in the non-volatile memory 203 and extinguishes the LED 215. The digital camera 200 completes the pairing with the smartphone 100 through Bluetooth communication in this manner.

According to the processing performed by the digital camera 200 described thus far, the control unit 201 senses that a predetermined operation (the confirmation operation) has been made on an operation member during the execution of the pairing processing (the release button being pressed in step S806). In response, the control unit 201 sends the encryption key of the digital camera 200 to the smartphone 100. In other words, the encryption key will not be sent, and thus the pairing will not be completed properly, unless the user makes the confirmation operation during the pairing processing. This ensures the security of the pairing processing.

The foregoing describes an example in which the digital camera 200 and the smartphone 100 are connected over what is known as wireless communication, such as Bluetooth or Wi-Fi. The digital camera 200 may also have a function for connecting to a smartphone or PC over a wire. In this case, connecting with a wire is determined to clearly indicate intent to connect, and thus if a wired connection is established while a wireless function such as Bluetooth or Wi-Fi is in an active state, the wired connection is prioritized, and the wireless function is deactivated.

According to the embodiment described above, when, in a state where an external apparatus has not yet been paired, a request for encrypted communication has been received from an external apparatus which received an advertising signal, the control unit 201 allows the request for encrypted communication in response to a predetermined operation being made with the release button 6. On the other hand, when, in a state where an external apparatus has already been paired, a request for encrypted communication has been received from an external apparatus which received an advertising signal, the control unit 201 can allow the request for encrypted communication without the predetermined operation being made with the release button 6. Additionally, when the mode change dial 7 is set to the communication mode and an external apparatus is already paired, the control unit 201 performs control to cancel the pairing with the external apparatus on the basis of an operation different from the predetermined operation made with the release button 6.

Second Embodiment

The foregoing first embodiment described a configuration in which a confirmation response is made in the digital camera 200, in response to a pairing request from the smartphone 100, by pressing the release button 6. However, in the present embodiment, a configuration is employed in which a mechanism for sensing that the gate member 3b of the carabiner part 3 has been opened and closed is provided, and the confirmation response is made by opening and closing the gate member 3b. Thus in the present embodiment, the gate member 3b of the carabiner part 3 is used as one of the operation members operated by the user. Note that in the following, an "operation of opening and closing the ring of the gate member 3b" can also be expressed simply as "opening and closing the carabiner part 3". Because the present embodiment shares many parts with the first embodiment, the following descriptions will omit parts that are the same, and will instead focus on parts unique to the present embodiment.

Carabiner Part of Digital Camera

Figure 10A:
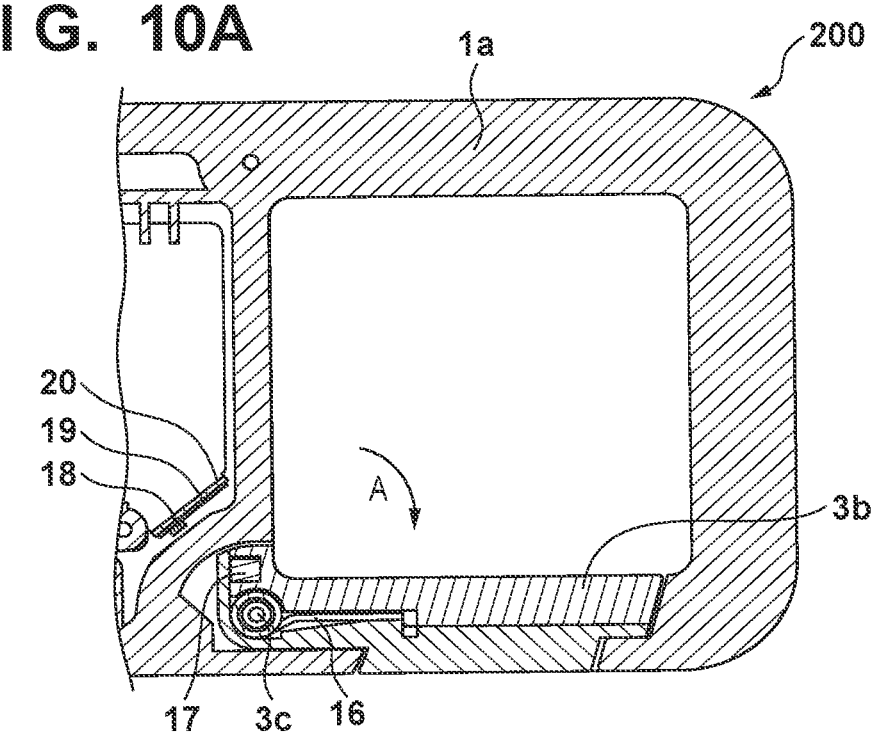
FIGS. 10A and 10B are diagrams illustrating an example of a structure that senses an opened/closed state of the carabiner part of the digital camera.
Figure 10B:
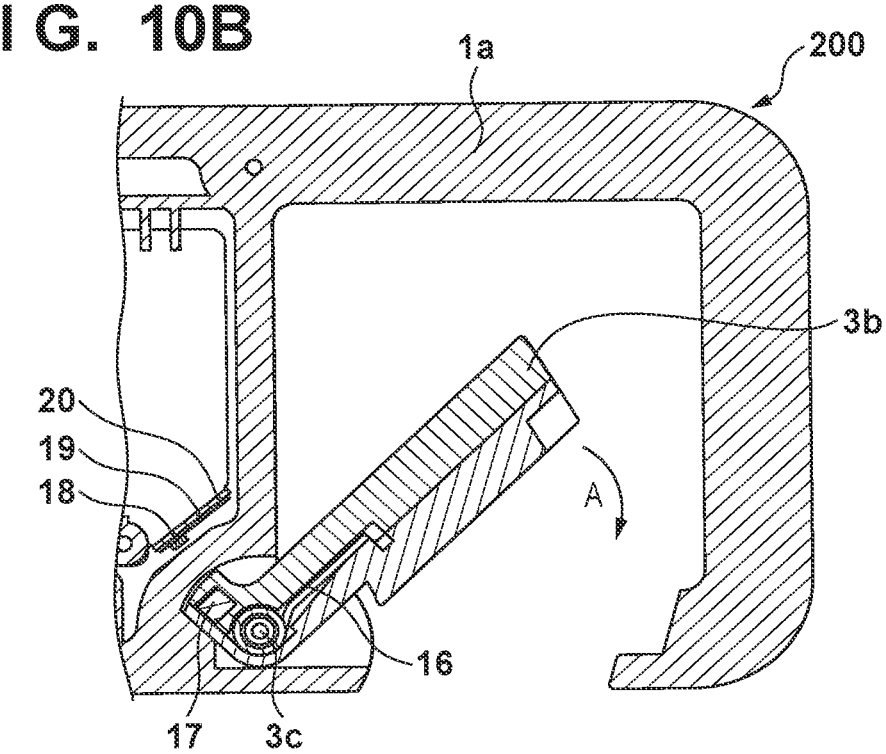

FIGS. 10A and 10B are diagrams illustrating an example of a structure that senses an opened/closed state of the carabiner part 3 of the digital camera 200 according to the present embodiment. FIG. 10A illustrates a state in which the carabiner part 3 is closed, and FIG. 10B illustrates a state in which the carabiner part 3 is open.

As described earlier, one end of the gate member 3b is axially supported by the rotation shaft 3c so as to be capable of pivoting. The gate member 3b receives biasing force in the direction of an arrow A, i.e., toward the closed state, from an opening/closing spring 16, and contacts the front cover a. A magnet 17 for sensing opening and closing is built into the gate member 3b. The magnet 17 is disposed so that the position thereof moves in response to the gate member 3b pivoting about the rotation shaft 3c. A neodymium iron boron-based magnet, which is small and provides a relatively strong magnetic force, can be used as the magnet 17, for example.

A magnetism sensor 18 that senses changes in a magnetic field caused by the magnet 17 moving is built into the digital camera 200. The magnetism sensor 18 is constituted by a Hall device that senses magnetic field changes in the vertical direction, and is disposed in a position which is opposite the magnet 17 when the carabiner part 3 is in the open state, as illustrated in FIG. 10B. The magnetism sensor 18 is mounted on, for example, a flexible printed circuit board 19, and a signal from the magnetism sensor 18 is output to the control unit 201 (see FIG. 2) through wiring of the flexible printed circuit board 19. The flexible printed circuit board 19 is precisely positioned with and fixed to a nonmagnetic chassis 20. The magnetism sensor 18 outputs a HIGH signal when a magnetic field approaches and outputs a LOW signal when the magnetic field moves away. In other words, when the magnetic flux density of the magnetic field of the magnet 17 is greater than a predetermined threshold, the HIGH signal is output, and when the magnetic flux density is less than or equal to the threshold, the LOW signal is output. Thus in the present embodiment, a sensing unit is constituted by the magnetism sensor 18 and the control unit 201. The control unit 201 can determine the opened/closed state of the carabiner part 3 on the basis of the signal output from the magnetism sensor 18. Through this, the control unit 201 can sense that an operation for opening and closing the gate member 3b has been performed.

Note that the magnetism sensor 18 is not limited to a Hall device, and may be a magnetism sensor such as a GMR sensor instead. Additionally, if water resistance of the digital camera 200 need not be taken into account, a contact-based detection switch that senses mechanical contact may be used instead of a magnetism sensor and a magnet.

Flow of Pairing Processing in Smartphone

The flow performed by the smartphone 100 is the same as in the foregoing first embodiment (FIG. 7), and will therefore not be described here.

Flow of Digital Camera in Pairing Processing

Figure 9:
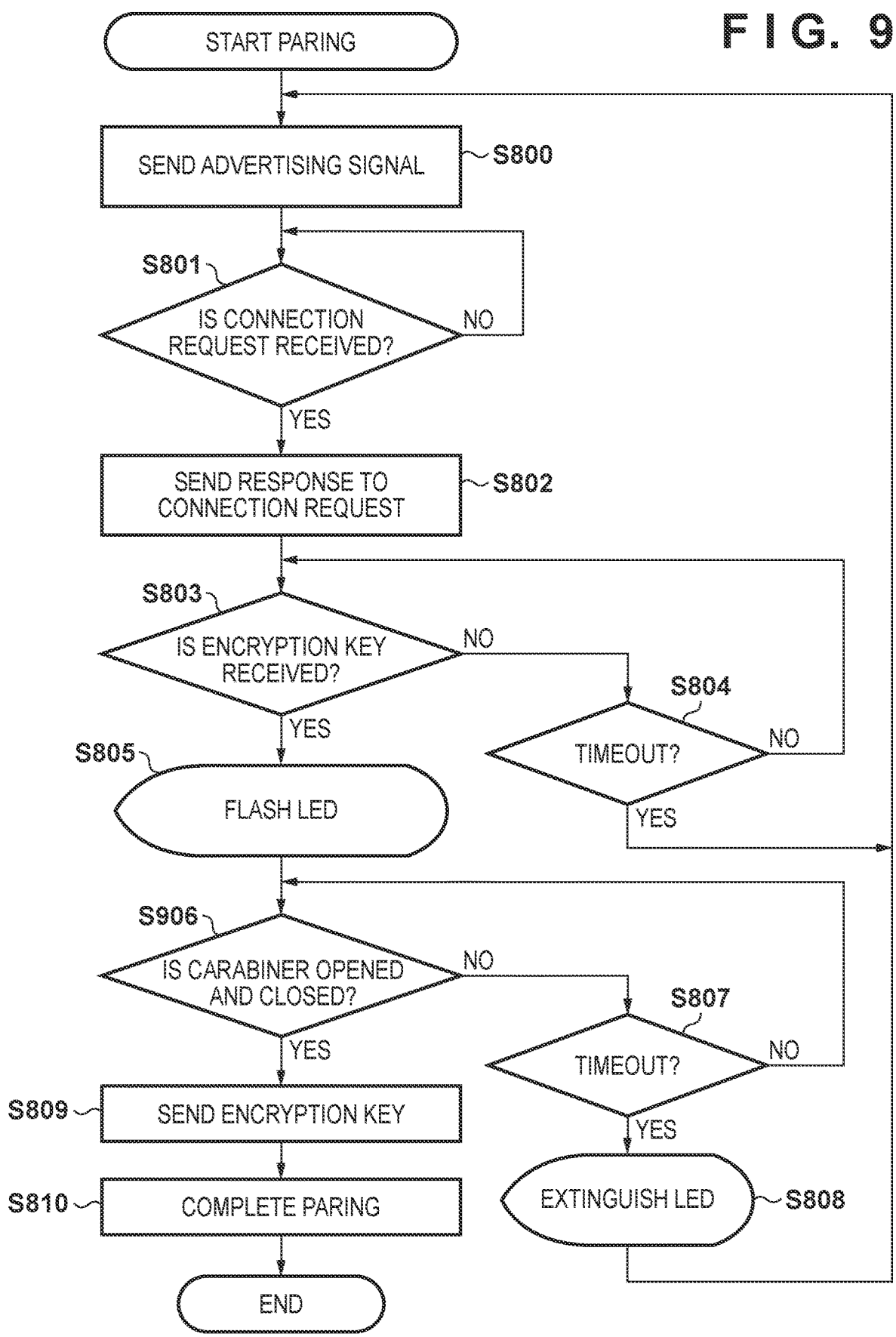
FIG. 9 is a flowchart illustrating pairing processing performed by the digital camera.

FIG. 9 is a flowchart illustrating pairing processing performed by the digital camera 200 according to the present embodiment. Steps S800 to S805 are the same as in FIG. 8, described in the first embodiment, and will therefore not be described.

Figure 6G:
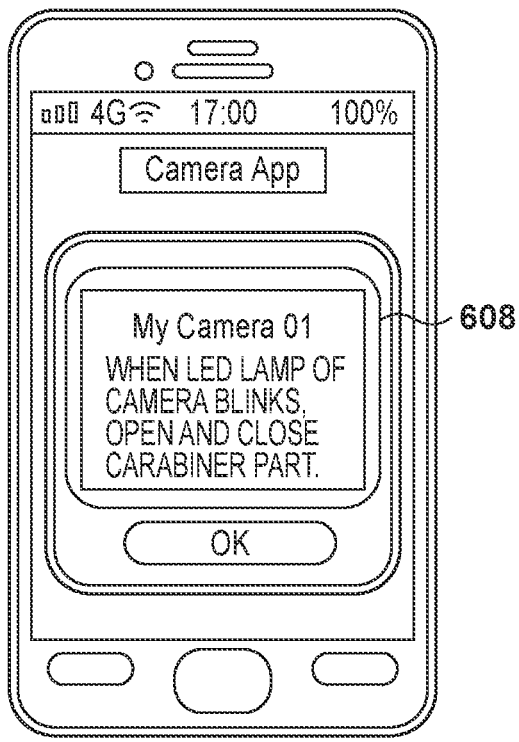

In step S906, the control unit 201 of the digital camera 200 determines whether or not the carabiner part 3 has been opened and closed by the user while the LED 215 is flashing. If opening and closing of the carabiner part 3 has been sensed, the control unit 201 determines that the user has confirmed the pairing with the smartphone that sent the encryption key received in step S803, and the sequence moves to step S809. However, if the control unit 201 has determined in step S906 that the carabiner part 3 has not been opened and closed, the sequence moves to step S807. The pairing confirmation operation of the carabiner part 3 being opened and closed, subject to the determination of step S906, corresponds to an operation carried out in accordance with the details displayed in the display unit 106 by the smartphone 100 in step S710 of FIG. 7. FIG. 6G illustrates an example of an operation procedure dialog 608 displayed in the display unit 106 of the smartphone 100 at this time. In other words, when the user wishes to pair with a smartphone 100A, the user responds to a pairing request from the smartphone 100A by operating the digital camera 200 on the basis of operating instructions displayed in the display screen of the smartphone 100A. If the pairing request is from a smartphone 100B, which is not to be paired, the operation procedure dialog 608 is displayed in a display unit of the smartphone 100B, and thus the user of the smartphone 100A cannot see that operation procedure dialog 608. Accordingly, the user of the smartphone 100A cannot respond to the pairing request using the digital camera 200. As a result, the digital camera 200 is prevented from pairing with an unintended smartphone.

The foregoing example describes the pairing confirmation operation as an operation of opening and closing the gate member 3b. However, the pairing confirmation operation may simply be an operation of opening the gate member 3b or an operation of closing the gate member 3b. As such, in the present embodiment, the gate member 3b receives a biasing force toward what is the closed state, and thus the opening and closing operation, opening operation, and closing operation are substantially the same. Additionally, the pairing confirmation operation may be opening and closing the carabiner part 3 twice in succession, a combination of opening and closing the carabiner part 3 and pressing the release button 6, or the like, instead of opening and closing the carabiner part 3 once. When a plurality of patterns are provided for the response operation in this manner, the configuration may be such that the details of the operation are included in the advertising signal and communicated to the smartphone, and the smartphone 100 then displays the operation method which has been communicated.

According to the present embodiment as described above, when, in a state where an external apparatus has not yet been paired, a request for encrypted communication has been received from an external apparatus which received an advertising signal, the control unit 201 allows the request for encrypted communication in response to an operation of opening and closing the carabiner part 3 having been received. Note that when, in a state where an external apparatus is already paired, a request for encrypted communication has been received from an external apparatus which received an advertising signal, the control unit 201 allows the request for encrypted communication without accepting an operation of opening and closing the carabiner part 3.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2019-153189, filed Aug. 23, 2019, which is hereby incorporated by reference herein in its entirety.

What is claimed is:

1. An image capturing apparatus comprising:
an image capturing unit;
a release switch for accepting, from a user, an instruction to capture an image using the image capturing unit;
a dial;
a control unit that controls the apparatus to operate in one of a plurality of modes in accordance with a state of the dial, the modes including a communication mode and a shooting mode; and
a communication unit that communicates with an external apparatus,
wherein the control unit:
controls the communication unit to issue an advertising signal in response to the dial entering a state corresponding to the communication mode;
in response to receiving a request for encrypted communication from the external apparatus that received the advertising signal in a state where the image capturing apparatus is not paired with the external apparatus and accepting a predetermined operation made on the release switch, allows the request for the encrypted communication;
in response to receiving a request for encrypted communication from the external apparatus that received the advertising signal in a state where the image capturing apparatus is paired with the external apparatus, allows the request for the encrypted communication without accepting the predetermined operation made on the release switch; and
in response to an operation different from the predetermined operation on the release switch being received in a state where the dial is in a state corresponding to the communication mode and the image capturing apparatus is paired with the external apparatus, cancels the pairing.

2. The image capturing apparatus according to claim 1, wherein when the advertising signal is issued in a state where the image capturing apparatus is paired with the external apparatus, the advertising signal includes information pertaining to the external apparatus; and
when the advertising signal is issued in a state where the image capturing apparatus is not paired with the external apparatus, the advertising signal does not include information pertaining to the external apparatus.

3. The image capturing apparatus according to claim 1, wherein in response to a state in which the release switch is operated continuing for greater than or equal to a predetermined amount of time in a state where the dial corresponds to the communication mode and the image capturing apparatus is paired with the external apparatus, the control unit cancels the pairing and controls the communication unit to start issuing an advertising signal that does not include information pertaining to the external apparatus.

4. The image capturing apparatus according to claim 1, wherein in response to the release switch no longer being in a state of being operated after a state in which the release switch is operated continuing for greater than or equal to a predetermined amount of time in a state where the dial corresponds to the communication mode and the image capturing apparatus is paired with the external apparatus, the control unit cancels the pairing and controls the communication unit to start issuing an advertising signal that does not include information pertaining to the external apparatus.

5. The image capturing apparatus according to claim 4, further comprising:
a second communication unit having a faster communication speed than the communication unit,
wherein in response to the release switch no longer being in a state of being operated after a state in which the release switch is operated has continued for a time longer than the predetermined amount of time in a state where the dial corresponds to the communication mode, the control unit activates the second communication unit without canceling the pairing.

6. The image capturing apparatus according to claim 1, wherein in response to an encryption key of the external apparatus being received from the external apparatus that received the advertising signal in a state where the image capturing apparatus is not paired with the external apparatus, and an operation of the release switch being sensed before a predetermined amount of time has passed after the encryption key of the external apparatus has been received, the control unit further allows the request for the encrypted communication, and sends an encryption key of the image capturing apparatus to the external apparatus.

7. The image capturing apparatus according to claim 6, further comprising:
a notifying unit that uses at least one of light and sound to notify the user that operating the release switch is enabled as a confirmation operation before the encryption key of the image capturing apparatus is sent, until the predetermined amount of time has passed.

8. The image capturing apparatus according to claim 1, wherein the advertising signal includes information pertaining to the predetermined operation made on the release switch.

9. The image capturing apparatus according to claim 1, wherein the image capturing apparatus does not include a display unit that displays information of an external apparatus to be paired.

10. The image capturing apparatus according to claim 1, further comprising:
a carabiner part that forms a ring, and that includes a gate member that opens and closes the ring,
wherein in response to receiving a request for encrypted communication from the external apparatus that received the advertising signal in a state where the image capturing apparatus is not paired with the external apparatus and accepting an operation of opening and closing the ring, the control unit allows the request for the encrypted communication; and
in response to receiving a request for encrypted communication from the external apparatus that received the advertising signal in a state where the image capturing apparatus is paired with the external apparatus, the control unit allows the request for the encrypted communication without accepting an operation of opening and closing the ring.

11. The image capturing apparatus according to claim 10, wherein the carabiner part includes a rotation shaft that axially supports one end of the gate member so that the gate member can pivot, and a magnet disposed in the gate member so that the position of the magnet changes in response to the gate member being pivoted about the rotation shaft;
the image capturing apparatus further comprises a magnetism sensor that senses a change in a magnetic field caused by the magnet moving; and
the control unit senses that an operation of opening and closing the ring has been performed on the basis of an output signal from the magnetism sensor.

12. A method of controlling an image capturing apparatus, the image capturing apparatus comprising:
an image capturing unit;
a release switch for accepting, from a user, an instruction to capture an image using the image capturing unit;
a dial;
a control unit that controls the image capturing apparatus to operate in one of a plurality of modes in accordance with a state of the dial, the modes including a communication mode and a shooting mode; and
a communication unit that communicates with an external apparatus, and
the method comprising:
controlling the communication unit to issue an advertising signal in response to the dial entering a state corresponding to the communication mode;
in response to receiving a request for encrypted communication from the external apparatus that received the advertising signal in a state where the image capturing apparatus is not paired with the external apparatus and accepting a predetermined operation made on the release switch, allowing the request for the encrypted communication;
in response to receiving a request for encrypted communication from the external apparatus that received the advertising signal in a state where the image capturing apparatus is paired with the external apparatus, allowing the request for the encrypted communication without accepting the predetermined operation made on the release switch; and
in response to an operation different from the predetermined operation on the release switch being received in a state where the dial is in a state corresponding to the communication mode and the image capturing apparatus is paired with the external apparatus, cancelling the pairing.

13. A non-transitory computer-readable storage medium on which is stored a program for causing a computer to function as the control unit of the image capturing apparatus according to claim 1.

* * * * *